United States Patent [19]

Weber et al.

[11] Patent Number: 5,163,247
[45] Date of Patent: Nov. 17, 1992

[54] AGRICULTURAL MULCH AND ROW COVER

[75] Inventors: Robert E. Weber, Marietta; William E. Knaak, Alpharetta, both of Ga.

[73] Assignee: Kimberly-Clark Corporation, Neenah, Wis.

[21] Appl. No.: 688,123

[22] Filed: Apr. 19, 1991

[51] Int. Cl.⁵ .............................................. A01N 25/34
[52] U.S. Cl. ........................................................... 47/9
[58] Field of Search ................................................ 47/9

[56] References Cited

U.S. PATENT DOCUMENTS

| | | | |
|---|---|---|---|
| 1,882,713 | 10/1928 | Angier | 47/95 |
| 2,203,274 | 6/1940 | Anderson et al. | 47/9 |
| 2,923,093 | 2/1960 | Allen | 47/56 |
| 2,974,030 | 3/1961 | Geary et al. | 47/9 |
| 3,303,609 | 2/1967 | MacHenry | 47/9 |
| 3,345,773 | 10/1967 | Sturgess et al. | 47/9 |
| 4,067,140 | 1/1978 | Thomas | 47/9 |
| 4,071,400 | 1/1978 | Jankowiak | 47/9 |

FOREIGN PATENT DOCUMENTS 2501006 9/1982 France ................................ 47/95

63-21965 1/1988 Japan ................................ 47/9

OTHER PUBLICATIONS

"Increased Mechanical Harvesting and Labor Costs Boost Interest In Paper Mulch" by Chuck Woods, vol. 72, No. 2, 1979.

*Primary Examiner*—David A. Scherbel
*Assistant Examiner*—Joanne C. Downs
*Attorney, Agent, or Firm*—Patrick C. Wilson

[57] ABSTRACT

The present invention relates to an agricultural mulch made from a fibrous cellulosic web having a certain breaking length and which had been surface-coated with a latex coating to improve wet strength and handling properties. The material of the present invention, once formed, is particularly suitable for use in agricultural applications to control weeds, soil moisture and temperature. The mulch can be engineered to have useful life which will correspnd to the growing cycle of a specific crop. Unlike plastic, once the crop has been harvested, the material of the present invention is much more suitable for composting due to the degradable nature of the product.

14 Claims, No Drawings

AGRICULTURAL MULCH AND ROW COVER

BACKGROUND OF THE INVENTION

The present invention relates to an agricultural mulch. More specifically, the mulch is made from a fibrous web of cellulose fibers having a breaking length from about 1.0 kilometers to about 6.20 kilometers. The web is surface coated with a coating containing a latex at an add on from at least about 30 dry parts coating per 100 parts fiber by weight to form the coated web. The coating at least partially saturates the web to increase both the dry and wet strength of the mulch with the coated web having an average strength of at least about 50 kilograms/square centimeter, a ratio of wet strength to dry strength ranging from at least 0.25 to about 0.7 and a Gurley[R] porosity of at least 200 seconds per 100 cubic centimeters of air displacement. Optionally, the fibrous web of cellulose fibers may contain a wet-strength resin to increase the wet strength of the mulch.

In addition to its use as an agricultural mulch, the material of the present invention may be suitable for other applications including bags and outer covers for personal care absorbent products such as diapers, feminine pads, training pants, incontinence products and wound dressings. Other possible applications include surgical drapes and gowns as well as other disposable items.

Biodegradability has become one of the most important, discussed and researched topics as the beginning of a new century approaches. The topic of biodegradability is being researched for a wide variety of products and materials. Plastics, however, are the materials which are getting the most attention when it comes to biodegradability. Plastics are often regarded as not being biodegradable because of the length of time it takes to break these materials down. Examples of such materials include: polyethylene, polypropylene, poly vinyl chloride, and most polyesters. A problem though in discussing the term biodegradability is the term itself. There are an abundance of definitions as to what is biodegradable and what biodegradability means from the standpoint of time and end degradation components.

A factor in determining biodegradability is the amount of oxygen and moisture available for the degradation process. Recent articles such as "Rubbish!" by William L. Rathje, *The Atlantic Monthly*, Dec. 1989, pg. 99–109, indicate that many landfills have insufficient oxygen and moisture to permit aerobic decomposition. One example given in the above article involved the excavation of a landfill which revealed newspapers from 1959 which were completely legible and in near perfect condition. Thus it can be seen that even materials such as newsprint, which is considered very biodegradable, will not degrade unless given the proper conditions.

One type of disposal which is fairly aerobic is composting. When certain materials are chopped and then mixed in with the top soil, an environment is created which is fairly conducive to degradation. Here again, however, some materials are more predisposed to degrading than others. For example, polyolefin films take lengths of time which are magnitudes greater than paper to break down. Today, many plastics are being mixed and extruded with other constituents, such as starch, to help them break down faster. But even in these cases the time to degrade is much longer than common paper. It is therefore an object of the present invention to provide a material which will degrade significantly when mulched and composted into the soil and yet will have the useful properties of many plastic films.

Thin plastic films are widely used today as replacements for paper. Perhaps one of the most common reasons plastics and especially plastic films are used instead of paper is the strength of plastics in both the wet and dry state. In addition, plastic films have gained their own niche due to the inherent properties of plastic. Examples of the widespread use of plastic include plastic bags, plastic wrap and outer covers for disposable products such as diapers, training pants, incontinence products and sanitary napkins. In all such cases the plastic is usually low cost, lightweight and high in strength in both the wet and dry states. As a result, at least from a convenience standpoint, products including these plastics are readily utilized by the consumer.

The agricultural field is another area where plastics are gaining wider use, particularly with respect to mulches. Plastic mulches are large strips of material which are laid down between and/or around plants to control weeds, soil temperature and erosion. Under such conditions, the plastic has sufficient strength and integrity to withstand the rigors of usage including wind and rain. Despite these advantages, however, disposal becomes a problem. At some point in the agricultural cycle, the mulch must either be removed, burned, tilled or disked into the ground. Removal is very time consuming and disking over time can result in the creation of a top soil layer laden with undecomposed or slowly decomposing plastic.

It is therefore an object of the present invention to provide a cellulose-based material which will have sufficient strength and barrier properties to act as a replacement for the above products while also having a sufficient degree of biodegradability. It is also an object to make this material as low cost as possible.

These and other objects of the present invention will become more apparent upon a further review of the following specification and claims.

SUMMARY OF THE INVENTION

The present invention relates to an agricultural mulch made from a fibrous web of cellulosic fibers having a breaking length of at least 1.0 kilometers and no greater than about 6.2 kilometers. The fibrous web is surface coated with a coating containing a latex in an add-on from about at least 30 dry parts coating per 100 parts fiber by weight to form a coated web with the coating at least partially saturating the fibrous web to increase the wet strength of the mulch. The coated web, once formed, has an average strength of at least about 50 kg/cm$^2$, and preferably at least about 93 kg/cm$^2$, a ratio of wet strength to dry strength ranging from about 0.25 to about 0.7 and a Gurley[R] porosity of at least 200 sec./100 cm$^3$ of air for a single sheet of the mulch material.

The agricultural mulch of the present invention can be modified by incorporating a number of additional components into the web itself, the coating or as a post-treatment. For example, humectants can be added to the coating or directly to the web. Plant nutrients can be added to either the web or the coating and these nutrients can also double as humectants. In addition, the coated web can include such things as an antimicrobial agent, a fertilizer, a pesticide and/or a fungicide. To increase the strength and drapeability of the material, the fibrous web may be creped or secondary reinforcing fibers may be added directly to the fibrous web to strengthen the structure. Wet strength resins may also be added to the web. Lastly, the coating for the fibrous web may contain a pigment for either absorbing or reflecting light. For example, carbon black may be added to increase light absorption, thereby causing the mulch to retain heat and thereby warm the soil. In contrast, the coating may contain a reflective pigment such as titanium dioxide which will keep the soil underneath the mulch cooler due to the reflection of light energy.

DETAILED DESCRIPTION OF THE INVENTION TEST METHODS USED

The present invention is directed to a latex treated cellulosic web which is particularly well-suited as an agricultural mulch for use in controlling and enhancing crop growth. The base material for the mulch is a fibrous web made from a plurality of cellulose fibers. Suitable webs include softwood kraft cellulose webs which typically have individual fiber lengths ranging from 2.6 mm to 4.2 mm. These webs when once formed should have breaking lengths of from about 1.0 kilometers to about 6.2 kilometers. Below this range the webs tend to be weak and therefore tear and break down too easily while above this range the webs are too dense and so the coatings will not partially penetrate the base webs. If desired, a wet strength additive can be added to the web as a part of its formation to provide wet sheet integrity during the subsequent coating step. For example, 0.3 parts Parez$^R$ 607 from American Cyanamid Co. or 0.3 part Kymene$^R$ 557H from Hercules Inc. can be added per 100 parts fiber by weight. Parez$^R$ 607 is a melamine-formaldehyde resin while Kymene$^R$ 557H is a cationic, polyamide-epichlorohydrin resin. Basis weights for the webs used in the Examples ranged from approximately 40 to 130 g/m$^2$ though basis weights outside this range can be used, if needed.

To enhance the integrity and useful life of the cellulose-based web, reinforcing fibers may be incorporated into the web. Synthetic and natural staple fibers are two categories of reinforcing fibers for the present invention. Examples of synthetic fibers include polyolefins and polyesters while examples of natural fibers include cotton, wool and rayon.

To further stabilize the web, the web is surface coated with a coating containing a latex. The coating add-on is from about at least 30 dry parts coating per 100 parts fiber by weight. The coating acts to at least partially penetrate the base web to reinforce the fiber structure and give the mulch the necessary degree of wet strength. In the examples which follow, the Mayer rod method was used to coat the webs. After the webs had been coated, they were dried, typically in a hot air oven, and then cured to crosslink the latex polymer.

Suitable latex compositions include, but are not limited to, self-crosslinking acrylic latex polymers, styrene-butadiene latex polymers, and acrylonitrile butadiene styrene (ABS) latex polymers. Such latexes may be cured using either internal or external curing processes. If desired, pigments may be incorporated into the coating material to cause the web to either absorb or reflect solar energy. The addition of carbon black darkens the mulch thereby causing it to absorb more energy to warm the soil. This will permit the planting of crops in seasons or under conditions where the soil temperature would typically be too cool for good plant growth. Conversely, in areas where soil temperatures run too high, reflective pigments, such as titanium dioxide, can be added to whiten the mulch, reflect sunlight and therefore keep the soil cooler.

Besides pigments, the mulch of the present invention may be treated with a humectant either within the web, itself, or within the coating. The purpose of the humectant is to make the mulch more flexible so that it will conform more closely to the contour of the soil surface. Glycerin is one example of a humectant which may be used with the present invention. Urea is another example of a humectant which is also a nutrient.

The agricultural mulch of the present invention may be treated with plant nutrients, fertilizers, pesticides, fungicides and antioxidants. The antioxidants are added to the coating and are used with such latexes as styrene-butadiene rubber to protect against oxidation. The nutrients, fertilizers, pesticides and fungicides may be added to the coating or they may be added to the composite material as a post-treatment.

Creping is another process which may be utilized with the present invention to increase the strength and flexibility of the coated fibrous web. The creping process also provides the cellulose web with improved energy absorbing properties and therefore a lower tendency to tear or rupture.

The useful life of barrier-type cellulosic mulches according to the present invention are generally in the range of about 140 days. Toward the end of this time frame the natural composting process will cause the mulch to lose much of its strength. In some situations, it is desireable to have a mulch which will last upwards of 10 months. To accomplish this, the web may be treated with an antimicrobial agent to destroy or prevent proliferation of organisms which are destructive to cellulose. Copper naphthenate is one such antimicrobial which may be added to the mulch.

To demonstrate the various attributes and variations of the present invention, a series of tests and examples were prepared as set forth below. The results of these examples can also be found in summary form in Table I.

To evaluate the properties and advantages of the present invention, several test methods and procedures were used. Several of these test methods are set forth below. Other test methods within the present application are referenced to standard procedures which are incorporated herein by reference.

TEST METHODS

Tensile properties of thin plastic sheeting - Test Method ASTM D882-88,

| | |
|---|---|
| Sample preparation: | sample width 15 mm, cut on a precision TMI cutter sample length not less than 150 mm sample thickness measured with a TMI Precision Micrometer, model no. 49-70, to the nearest 0.001 mm |
| Tensile tester: | Instron Model No. 1122 Instron grip separation, 100 mm |
| | Initial strain rate $\frac{3 \text{ mm}}{\text{mm min.}}$ |

The mulch web strength was based on the maximum tensile of the material and was an average of machine direction (MD) and cross direction (CD) values of the web divided by the original minimum cross-sectional area of the specimen measured in cm$^2$.

Tensile strength for wet tensiles was calculated based upon the unit area measurements before wetting. In this case, the prepared test strips were soaked in a 1% aqueous Triton$^R$ X-100 solution for one hour before testing. Triton$^R$ X-100 is a surfactant manufactured by the Union Carbide Corporation of Danbury, CT.

The tensile strength of the unsaturated webs of the present invention was measured by the breaking lengths of the webs which was the average of the MD and CD tensile strengths in kilograms per meter (kg/m) divided by the basis weight of the particular web in kilograms per square meter (kg/m$^2$) to produce a web whose breaking length was expressed as a unit length using TAPPI method T 494-om-81. Breaking length, simply stated, was the length of a web that when suspended from one end would break under its own weight.

The barrier property of the mulch to the passage of a gas or vapor through the mulch web structure was measured as the resistance to air flow by a Gurleye porosity test instrument. The test was performed in accordance with TAPPI test method T460-om-88 and was a measurement of the time required in seconds to displace 100 cm$^3$ of air through an area of 6.4 cm$^2$.

EXAMPLES

EXAMPLE I

A compostable agrimulch was formed using a softwood kraft cellulose web with a wet strength additive (0.3 part Parez$^R$ 607 by American Cyanamid Co. per 100 parts fiber). The wet strength additive was used to provide wet sheet integrity during the process step of coating. The basis weight of the web was 52 g/m$^2$ and it had a breaking length of about 6.2 km. The base web was coated using the Mayer rod method with a self crosslinking acrylic latex polymer with a Tg of −15° C. (Hycar$^R$ 26322 by B.F. Goodrich Co.). The coating viscosity was low, i.e. 50 cps, so the latex would partially penetrate the base web to reinforce the fiber structure. After coating, the web was dried in a hot air oven at 107.C and then cured at the same temperature for 45 minutes. The purpose of the cure was to crosslink the latex polymer so as to impart wet strength properties to the mulch. The dry coat weight on the web was 22 g/m$^2$. The average dry strength of the mulch was 394 kg/cm$^2$ using ASTM D882-88 test method for Thin Plastic Sheeting (units either in kg/cm$^2$ or PSI). The wet to dry strength ratio was 0.61. The air porosity of the mulch was very low so as to provide a barrier to soil moisture evaporation and soil fumigation gasses. In this case the Gurley$^R$ porosity value was tested to be 300 seconds/100 cm$^3$ air displacement for a single mulch sheet.

EXAMPLE II

A compostable agrimulch was formed from a wet-creped softwood kraft cellulose web containing a wet strength resin (Kymene$^R$ 557H by Hercules Inc.). The Kymene$^R$ was added to the pulp before the web was formed on the paper machine to provide wet sheet integrity during the coating process step. The amount of wet strength resin was 0.3 part per 100 parts fiber by weight. The dry basis weight of the wet-creped web was 44 g/m$^2$ and the web had an average breaking length of 3.9 km. The creped web was coated using the Mayer rod method with a styrene-butadiene latex containing 4 parts carbon black pigment for every 100 dry parts latex binder. The latex was Styronal$^R$ 4574 from BASF. The coating solids were adjusted so the latex coating partially penetrated the creped web. In this case the solids content was 49%. Penetration of the base web by the latex acted to reinforce the fiber structure as in Example I. The coating was then dried and cured as in Example I. The dry coat weight on the creped web was 22 g/m$^2$. The average dry strength of the mulch web was 142 kg/cmhu 2 and the wet to dry strength ratio was 0.32. The air porosity of the web was very low with the Gurley$^R$ air porosity value being greater than 1500 seconds/100 cm$^3$ for a single sheet of material.

The coated and creped composite had good strength and excellent barrier properties thereby making it an excellent agricultural mulch. In addition, the black color provided added solar heat to the soil for rapid heating of the soil and roots during the cooler growing months.

EXAMPLE III

This agrimulch has the same general properties as Example II, except for color. In this case titanium dioxide (TiO$_2$) pigment was substituted for the carbon black pigment. The amount of TiO$_2$ was 20 dry parts pigment for every 100 dry parts latex. Substitution of the TiO$_2$ pigment resulted in a white surface on the mulch which reflected much of the solar energy, thereby providing a cooler soil for plants. This type of mulch cover is most suitable for use during the hot summer and early fall months.

EXAMPLE IV

A compostable agrimulch consisting of a softwood kraft cellulose web with a basis weight of 128 g/m$^2$ and a breaking length of about 1.1 km was coated with a butadiene-styrene latex using the Mayer rod method. When the coating was applied, it partially penetrated into the base web to reinforce the fiber structure. (The coating latex was Butofan$^R$ 4262 by BASF.) An antioxidant protectant (Wingstay$^R$ L by Goodyear Chemical Co.) was added at a level of 0.1 part antioxidant per 100 parts latex. The coat was dried in a hot air oven at 107° C. and then cured at the same temperature for one hour. The dry coat weight on the web was 100 g/m$^2$. The average dry strength of the mulch web was 93 kg/cm$^2$ and the wet to dry strength ratio was 0.70. The air porosity was low with a Gurley$^R$ value of greater than 1500 seconds/100 cm$^3$ for a single sheet.

EXAMPLE V

This example was similar to Example II in that it used the same base web and coating method. In this case the partially penetrating coating was an acrylonitrile butadiene styrene (ABS) latex (Hycar$^R$ 1570x55 from B.F. Goodrich Chemical Co.) containing 20 parts glycerin for every 100 parts ABS latex. The glycerin was used as a humectant to make the mulch web more flexible which in turn would enable the web to more closely conform to the contour of the soil surface. Making the material more flexible would also provide better heat transfer to the soil. The wet strength of the material was developed by curing the web in roll form at 107° C. for 3 hours and then unwinding the web and cooling it to room temperature. The coat weight was 41 g/m$^2$ and constituted 88 dry parts of coating for every 100 parts fiber by weight. The average dry strength of the mulch web was 164 kg/cmhu 2 with a wet to dry strength ratio of 0.38. The air porosity was very low (Gurley$^R$ value greater than 3000 seconds/100 cm$^3$ for a single sheet) thereby providing an excellent gas barrier.

EXAMPLE VI

The creping process generally provides improved energy absorbing properties for a cellulose web because of the compacting of the web structure. This increases the tensile energy absorption (TEA) and as a result lowers the tendency to tear or rupture the web structure. This was illustrated with Examples II, III, and V with the wet creping process to form a compacted web before the coating step. A post coating creping process is the Clupak$^R$ compacting method where the dry web is remoistened and then compacted. In this example, a web of 40% softwood kraft and 60% ground wood cellulose with 2% Kymene$^R$ 557 wet strength resin (basis weight 50 g/m$^2$ and breaking length of 3.3 km.) was coated with a partially penetrating coating of acrylic latex (Hycar$^R$ 26322 from the B.F. Goodrich Company, Tg of $-15°$ C.) and 4% carbon black pigment using the Mayer rod method. The coating was dried and cured as in Example I. The dry coat weight was 16 g/m$^2$. The web was then creped using the Clupak$^R$ method at Clupak Corporation in New York, NY. This increased the energy absorption of the mulch by 46% as measured by TEA (TAPPI method T494-om-81). The average dry strength of the mulch was 201 kg/cm$^2$. The wet to dry strength ratio was 0.50 and the Gurley$^R$ porosity was 356 seconds/100 cm$^3$ for a single sheet.

EXAMPLE VII

The useful life of barrier-type cellulose mulches according to the present invention are in the range of about 140 days before the natural composting dominates and the mulch loses most of its strength. In some cases it is desirable for these webs to have functional lives up to 10 months. In such cases a preservative can be added to extend the useful life of the mulch. The following is such a composite.

A 48 g/m$^2$ cellulose base web similar to that in Example II was Mayer rod coated with 33 g/m$^2$ of a partially penetrating coating of a polyacrylate latex, Rhoplex$^R$ B-15 from Rohm & Haas Co. The coating was dried and cured for 3 hours at 107.C. To the opposite side of this web there was applied using the Mayer rod method a light coating of Rhoplex$^R$ B-15 with 13% by weight of copper naphthenate in an oil/water emulsion. Copper naphthenate is classified as an antimicrobial agent and will destroy or prevent proliferation of a number of organisms that are destructive to cellulose and plant life. After the secondary coating had been dried, the coating weight was calculated to be 20 g/m$^2$. The average strength of the material was 168 kg/cm$^2$ and the wet to dry strength ratio was 0.35. The Gurley$^R$ air porosity value was 560 seconds/100 cm$^3$ for a single sheet.

EXAMPLE VIII

The material of this example was similar to Example VII except for the secondary coating. In this case a flexographic printing press was used to apply the copper naphthenate preservative as a oil-based ink to the opposite side of the web. The add-on of copper naphthenate was 5.6 g/m$^2$.

EXAMPLE IX

In this example, a plant nutrient was added to the mulch. The material was the same as Example VII except for the fact that the secondary coating was replaced by a coating containing a plant nutrient. The coating contained a nutrient source of 4.6, 5.2, 4.5 of N, P$_2$O$_5$ respectively for 100 dry parts of coating by weight. This weight of the nutrient coating was 41 g/m$^2$. The coating composition comprised Rhoplex$^R$ B-15, urea and KH$_2$PO$_4$. The average strength of the mulch was 182 kg/cm$^2$ with a wet to dry strength ratio of 0.33 and Gurley$^R$ air porosity of 1,277 seconds/100 cm$^3$ for a single sheet. The urea nutrient was also a humectant.

EXAMPLE X

Example VII and VIII show how the useful life of the mulch can be extended with an anitmicrobial agent. In this example the useful life was extended by the addition of a secondary reinforcement fiber which would degrade at a much slower rate and therefore hold the mulch structure together longer. The following is such an example.

A 101 g/m$^2$ base web containing 75% softwood kraft cellulose fiber and 25%, 6 denier, 13 mm polyester fiber was made on a Fourdrinier paper making machine. The base web contained 0.3 part wet strength resin (Kymene$^R$ 557H by Hercules Inc.) per 100 dry parts fiber by weight. The wet strength additive was used as a processing aid for the coating step. The breaking length of the base web was 2.2 km. The web was Mayer rod coated with 40 g/m$^2$ of a partially penetrating coating of a styrene-butadiene latex (Butofan$^R$ 4262 by BASF). An antioxidant protectant (WingstayeL by Goodyear Chemical Co.) was added at a level of 0.1 part antioxidant per 100 parts latex. The coating was dried in a hot air oven at 107° C. and then cured at the same temperature for one hour. The average dry strength of the mulch web was 116 kg/cm$^2$ and the wet to dry strength ratio was 0.43. The air porosity was low (Gurley$^R$ value greater than 1000 seconds/100 cm$^3$ for a single sheet).

Having thus described the invention in detail, it should be appreciated that various modifications and changes can be made in the present invention without departing from the spirit and scope of the following claims.

TABLE I

|  | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | EXAMPLE 10 |
|---|---|---|---|---|---|---|---|---|---|---|
| BREAKING LENGTH BASE WEB (km) | 6.2 | 3.9 | 3.9 | 1.1 | 3.9 | 3.3 | 3.9 | 3.9 | 3.9 | 2.2 |
| WET STRENGTH IN BASE WEB | YES | YES | YES | NONE | YES | YES | YES | YES | YES | YES |
| CREPED WEB WET CREPE (WC) CLUPAC$^R$ (CLU) | NO | WC | WC | NO | WC | CLU | WC | WC | WC | NO |

TABLE I-continued

| | EXAMPLE 1 | EXAMPLE 2 | EXAMPLE 3 | EXAMPLE 4 | EXAMPLE 5 | EXAMPLE 6 | EXAMPLE 7 | EXAMPLE 8 | EXAMPLE 9 | EXAMPLE 10 |
|---|---|---|---|---|---|---|---|---|---|---|
| COATING ADD-ON DRY PARTS PER 100 PARTS FIBER BY WEIGHT | | | | | | | | | | |
| BARRIER COAT | 42 | 50 | 50 | 78 | 93 | 32 | 69 | 69 | 69 | 40 |
| FUNCTIONAL COAT | NONE | NONE | NONE | NONE | NONE | NONE | 42 | 12 | 85 | NONE |
| AVERAGE WEB DRY STRENGTH (kg/cm$^2$) | 394 | 142 | 142 | 93 | 164 | 201 | 168 | 168 | 182 | 116 |
| AVERAGE WET/DRY STRENGTH RATIO | 0.61 | 0.32 | 0.32 | 0.70 | 0.38 | 0.50 | 0.35 | 0.35 | 0.33 | 0.43 |
| GURLEY$^R$ POROSITY FOR SINGLE SHEET | 300 | >1500 | >1500 | >1500 | >3000 | 356 | 560 | 560 | 1277 | >1000 |
| LATEX TYPE IN BARRIER COAT | ACRYLIC | SBR | SBR | SBR | ABS | ACRYLIC | ACRYLIC | ACRYLIC | ACRYLIC | SBR |
| PIGMENT TYPE IN BARRIER COAT | NONE | CARBON BLACK | TiO$_2$ | NONE | NONE | CARBON BLACK | NONE | NONE | NONE | NONE |
| LATEX TYPE IN FUNCTIONAL COAT | NONE | NONE | NONE | NONE | NONE | NONE | ACRYLIC | NONE | ACRYLIC | NONE |
| HUMECTANT IN COATING | NONE | NONE | NONE | NONE | GLYCERIN | NONE | NONE | NONE | UREA | NONE |
| ANTIMICROBIAL AGENT IN FUNCTIONAL COATING | NONE | NONE | NONE | NONE | NONE | NONE | COPPER | COPPER | NONE | NONE |
| NUTRIENT IN FUNCTIONAL COATING | NONE | NONE | NONE | NONE | NONE | NONE | NONE | NONE | UREA (KH$_2$PO$_4$) | NONE |

What is claimed is:

1. An agricultural mulch comprising:
   a fibrous web including a plurality of cellulose fibers, said fibrous web having a breaking length of at least 1.0 kilometers and no greater than about 6.2 kilometers,
   said fibrous web being surface coated with a coating containing a latex in an add on from about at least 30 dry parts coating per 100 parts fiber by weight to form a coated web, said coating at least partially saturating said fibrous web to increase the wet strength of the mulch, said coated web having an average strength of at least about 50 kg/cm$^2$, a ratio of wet strength to dry strength ranging from about 0.25 to about 0.7 and a Gurley$^R$ porosity of at least 200 seconds per 100 cubic centimeters of air displacement for a single sheet.

2. The agricultural mulch of claim 1 wherein said coating further contains a humectant within said coating.

3. The agricultural mulch of claim 1 wherein said fibrous web further includes a humectant within said web.

4. The agricultural mulch of claim 2 wherein said humectant is also a plant nutrient.

5. The agricultural mulch of claim 3 wherein said humectant is also a plant nutrient.

6. The agricultural mulch of claim which further includes an antimicrobial agent.

7. The agricultural mulch of claim which further includes a fertilizer.

8. The agricultural mulch of claim 1 wherein said coating further includes a pigment for either absorbing or reflecting light.

9. The agricultural mulch of claim 1 wherein said fibrous web is creped.

10. The agricultural mulch of claim 1 wherein said fibrous web is reinforced with a secondary fiber.

11. The agricultural mulch of claim 1 wherein said fibrous web contains a wet strength resin.

12. The agricultural mulch of claim which further includes a pesticide.

13. The agricultural mulch of claim 1 which further includes a fungicide.

14. The agricultural mulch of claim 1 wherein said coated web has an average strength of at least about 93 kg/cm$^2$.

* * * * *